United States Patent
Winer et al.

(10) Patent No.: US 11,550,605 B2
(45) Date of Patent: Jan. 10, 2023

(54) BUILDING AND MANAGING COHESIVE INTERACTION FOR VIRTUAL ASSISTANTS

(71) Applicant: Kasisto, Inc., New York, NY (US)

(72) Inventors: David R. Winer, Brooklyn, NY (US); Jackson Deitelzweig, Bedford, NY (US); Sasha Caskey, New York, NY (US)

(73) Assignee: Kasisto, Inc., New York, NY (US)

( * ) Notice: Subject to any disclaimer, the term of this patent is extended or adjusted under 35 U.S.C. 154(b) by 281 days.

(21) Appl. No.: 16/916,705

(22) Filed: Jun. 30, 2020

(65) Prior Publication Data
US 2021/0406048 A1    Dec. 30, 2021

(51) Int. Cl.
*G06F 9/451*    (2018.01)
*G06F 40/166*   (2020.01)
(Continued)

(52) U.S. Cl.
CPC ............ *G06F 9/453* (2018.02); *G06F 40/166* (2020.01); *G06F 40/205* (2020.01); *G06N 5/00* (2013.01);
(Continued)

(58) Field of Classification Search
CPC ...... G06F 9/453; G06F 16/353; G06F 40/166; G06F 40/205; G06F 40/35; G06N 3/006;
(Continued)

(56) References Cited

U.S. PATENT DOCUMENTS

| 7,197,460 B1 | 3/2007 | Gupta et al. |
| 8,630,961 B2 * | 1/2014 | Beilby .................. G06N 3/004 706/11 |

(Continued)

FOREIGN PATENT DOCUMENTS

| CN | 110612525 A | * 12/2019 | ........... G06F 16/322 |
| CN | 112106056 A | * 12/2020 | ......... G06F 16/9027 |

(Continued)

OTHER PUBLICATIONS

Poulis, Algorithms for Interactive Machine Learning, 2019, Thesis, University of California, San Diego, Department of Computer Science (Year: 2019).*

(Continued)

*Primary Examiner* — Eric Nowlin
(74) *Attorney, Agent, or Firm* — Ryan, Mason & Lewis, LLP

(57) ABSTRACT

A method includes receiving data comprising a plurality of requests and a plurality of responses to the requests. The requests and the responses are associated with a virtual assistant programmed to address the plurality of requests. In the method, a machine learning (ML) classifier is used to partition the requests into a plurality of partitions corresponding to a plurality of request types. An interface for a user is generated to display a subset of the requests corresponding to at least one partition of the plurality of partitions and to display a response corresponding to the subset of the plurality of requests, wherein the response is based on one or more of the plurality of responses. The interface is configured to permit editing of the response by the user. The method also includes processing the response edited by the user, and transmitting the edited response to the virtual assistant.

29 Claims, 12 Drawing Sheets

(51) Int. Cl.
*G06N 5/04* (2006.01)
*G06N 20/00* (2019.01)
*H04L 51/02* (2022.01)
*G06N 5/00* (2006.01)
*G06F 40/205* (2020.01)

(52) U.S. Cl.
CPC .............. *G06N 5/04* (2013.01); *G06N 20/00* (2019.01); *H04L 51/02* (2013.01)

(58) Field of Classification Search
CPC .. G06N 3/08; G06N 5/00; G06N 5/04; G06N 20/00; H04L 51/02
See application file for complete search history.

(56) References Cited

U.S. PATENT DOCUMENTS

| | | | | |
|---|---|---|---|---|
| 9,369,410 | B2* | 6/2016 | Capper | H04L 51/02 |
| 9,508,339 | B2* | 11/2016 | Kannan | G10L 15/22 |
| 9,794,199 | B2* | 10/2017 | Capper | G06N 20/00 |
| 10,296,160 | B2* | 5/2019 | Shah | G06F 40/295 |
| 10,796,102 | B2* | 10/2020 | Galitsky | G06F 16/322 |
| 10,853,581 | B2* | 12/2020 | Galitsky | G06F 16/3329 |
| 10,978,056 | B1* | 4/2021 | Challa | G06F 16/3344 |
| 2014/0250195 | A1* | 9/2014 | Capper | G06N 20/00 709/206 |
| 2016/0352658 | A1* | 12/2016 | Capper | H04L 51/02 |
| 2018/0288616 | A1* | 10/2018 | Knox | G06N 20/00 |
| 2018/0329879 | A1* | 11/2018 | Galitsky | G06F 16/322 |
| 2018/0329880 | A1* | 11/2018 | Galitsky | G06N 3/08 |
| 2018/0357220 | A1 | 12/2018 | Galitsky | |
| 2019/0294925 | A1* | 9/2019 | Kang | G06N 3/0445 |
| 2019/0311375 | A1* | 10/2019 | Sapoznik | G06Q 30/016 |
| 2020/0026757 | A1* | 1/2020 | Bagley, Jr. | G06F 40/30 |
| 2020/0380214 | A1* | 12/2020 | Galitsky | G06F 40/44 |
| 2021/0049329 | A1* | 2/2021 | Galitsky | G06K 9/6201 |
| 2021/0082420 | A1* | 3/2021 | Kraljic | G06F 40/216 |
| 2021/0118440 | A1* | 4/2021 | Peng | G06F 40/216 |
| 2021/0125026 | A1* | 4/2021 | Perez Rua | G06N 3/08 |
| 2021/0141865 | A1* | 5/2021 | Machado | G06N 3/04 |
| 2021/0174240 | A1* | 6/2021 | Chakraborti | G06N 7/005 |
| 2021/0319359 | A1* | 10/2021 | Ustimenko | G06N 5/003 |
| 2022/0284171 | A1* | 9/2022 | Laxman | G06F 40/284 |

FOREIGN PATENT DOCUMENTS

| | | | | |
|---|---|---|---|---|
| JP | 2020522044 A | * | 7/2020 | .......... G06F 16/322 |
| JP | WO2020036191 A1 | * | 6/2021 | |
| JP | WO2020036192 A1 | * | 6/2021 | |
| JP | 2022031555 A | * | 2/2022 | .......... G06K 9/6262 |
| JP | 2022050439 A | * | 3/2022 | .......... G06F 16/322 |
| JP | 7060824 B2 | * | 4/2022 | .......... G06K 9/6262 |
| JP | 7068596 B2 | * | 5/2022 | ............ G06N 20/00 |
| JP | 2022079509 A | * | 5/2022 | ............ G06N 20/00 |
| JP | 7086993 B2 | * | 6/2022 | .......... G06F 16/322 |
| JP | 2022122999 A | * | 8/2022 | .......... G06F 16/322 |
| WO | WO-2010078614 A1 | * | 7/2010 | ............ G06N 3/004 |
| WO | WO-2018208979 A1 | * | 11/2018 | .......... G06F 16/322 |
| WO | WO-2020036191 A1 | * | 2/2020 | ............ G06N 20/00 |
| WO | WO-2020036192 A1 | * | 2/2020 | .......... G06K 9/6262 |
| WO | WO-2020130447 A1 | * | 6/2020 | ........ G06F 16/3322 |
| WO | WO-2020180286 A1 | * | 9/2020 | ............ G10L 13/02 |
| WO | WO-2021076304 A1 | * | 4/2021 | ....... G06F 16/90332 |
| WO | WO-2022115736 A1 | * | 6/2022 | ............ G06F 40/35 |
| WO | WO-2022159461 A1 | * | 7/2022 | .......... G06F 40/295 |

OTHER PUBLICATIONS

X. Li et al., "Learning Question Classifiers," In Proceedings of ACL 2002, 7 pages.

W. C. Mann et al., "Rhetorical Structure Theory: A Theory of Text Organization," The Structure of Discourse, Jun. 1987, 87 pages.

* cited by examiner

500

Label: NEW-ID-185
Seed Question: Hi, I received the message that my application for credit card was successful on Dec 11th and it takes 1-1 BD to ship the card. So far, I have not received it yet, could you pls check?
Default Answer:
If you did not receive the card that was mailed to your registered local mailing address in our bank's record within 3 to 5 business days or longer for overseas address (upon approval of application/replacement request), please contact us immediately at 1800 555 5555 or (65) 5555 5555 from overseas for a new card replacement.

Seed Question Type: Description
Cohesion: 0.401
Number of Question Types: 9

Submit Answer

FIG. 5

Method: 18.81% (60/319)

Answer:
To get a new card, or check on your existing card, here's what you can do...

Examples:
I need help regarding receiving my new card till date. (1.000)
How do I get a new credit card sent to me (1.000)
Please help me because I haven't received my new credit/debit card. (1.000)
How can I get my new credit card? (1.000)
I need help because I have not yet received a new credit/debit card. (1.000)

Submit Answer

Answer:
We can look into why your card hasn't arrived yet.

Examples:
I have requested for my debit card online about 1 weeks ago, why hasn't it arrived? (1.000)
Can you help me figure out why I didn't get my newly applied credit card as of yet? (1.000)
I applied for a new credit card and haven't gotten it yet. Why is that? (1.000)
Is there a reason why I have not yet received my newly applied card? (1.000)
my credit card not arrived to me yet. why ? (1.000)

Submit Answer

Reason: 16.61% (53/319)

Error: 15.36% (49/319)

Answer:
I'm sorry you haven't received your card yet. Here is what we can do.

Examples:
Until now I didn't recive my atmosphere card (1,000)

FIG. 8

BUILDING AND MANAGING COHESIVE INTERACTION FOR VIRTUAL ASSISTANTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for improving interactions between users and virtual assistants.

BACKGROUND

Virtual assistants, also referred to herein as "chatbots" or "software agents," refer to software for conducting a conversation with a user via verbal or textual methods. A virtual assistant uses natural language processing (NLP) and natural language understanding (NLU) techniques to process verbal (e.g., spoken) and textual natural language questions and/or responses from a user. Virtual assistants often need to differentiate between multiple questions and responses in order to respond appropriately to a user.

In conventional systems, virtual assistants can seem like they are selecting from a plurality of pre-configured responses that are not necessarily responsive to a user's input, and do not always match with how a user is interacting with the system. Generating appropriate responses that enable a virtual assistant to appear to better understand a user's intent and goals has important consequences for how users perceive and interact with a virtual assistant.

Accordingly, there is a need for techniques to improve the responsiveness of virtual assistants to the various inputs that may be posed by a plurality of users.

SUMMARY

Illustrative embodiments correspond to techniques for enabling virtual assistants to interact more cohesively with users. Embodiments utilize one or more machine learning (ML) techniques to evaluate how many interaction modes (also referred to herein as "request types") are needed for a plurality of topics. An answer management system (AMS) is used to allow a user to visualize the interaction modes, and to review and edit responses a virtual assistant provides for each interaction mode.

In one embodiment, a method comprises receiving data comprising a plurality of requests and a plurality of responses to the requests. The requests and the responses are associated with a virtual assistant programmed to address the plurality of requests. In the method, an ML classifier is used to partition the requests into a plurality of partitions corresponding to a plurality of request types. An interface for a user is generated to display a subset of the requests corresponding to at least one partition of the plurality of partitions and to display a response corresponding to the subset of the plurality of requests, wherein the response is based on one or more of the plurality of responses. The interface is configured to permit editing of the response by the user. The method also includes processing the response edited by the user, and transmitting the edited response to the virtual assistant.

Further illustrative embodiments are provided in the form of a non-transitory computer-readable storage medium having embodied therein executable program code that when executed by a processor causes the processor to perform the above steps. Still further illustrative embodiments comprise an apparatus with a processing platform configured to perform the above steps.

BRIEF DESCRIPTION OF THE DRAWINGS

FIG. 5 is an image of a screenshot of a user interface showing a description seed question type and for inputting a response to the description seed question type in an illustrative embodiment.

FIG. 6 is an image of a screenshot of a user interface for inputting a response for a method question type in an illustrative embodiment.

FIG. 7 is an image of a screenshot of a user interface for inputting a response for a reason question type in an illustrative embodiment.

FIG. 8 is an image of a screenshot of a user interface for inputting a response for an error question type in an illustrative embodiment.

DETAILED DESCRIPTION

Illustrative embodiments will be described herein with reference to exemplary processing systems and associated computers, servers, storage devices and other processing devices. It is to be appreciated, however, that embodiments are not restricted to use with the particular illustrative system and device configurations shown.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence where natural language input is disassembled and parsed to determine appropriate syntactic and semantic schemes in order to comprehend and use languages. NLU may rely on computational models that draw from linguistics to understand how language works, and comprehend what is being said by a user.

Figure 1:
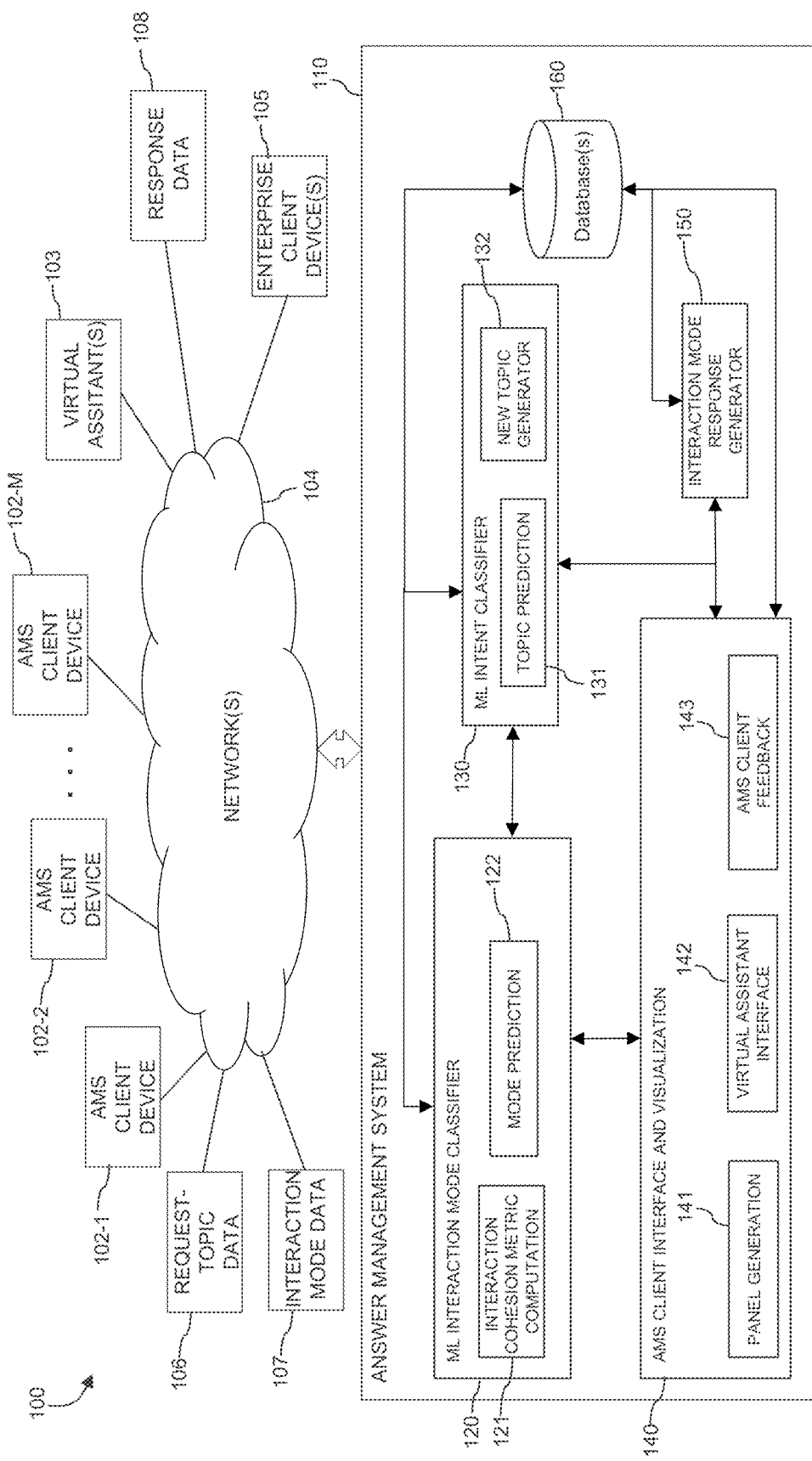
FIG. 1 is a block diagram of an information processing system comprising an answer management system configured for managing and editing interaction modes for a virtual assistant so that the virtual assistant interacts cohesively with a user in an illustrative embodiment.

FIG. 1 shows a processing system 100 configured in accordance with an illustrative embodiment. The processing system 100 comprises answer management system (AMS) client devices 102-1, 102-2, . . . 102-M (collectively "AMS client devices 102"), one or more virtual assistants 103 and one or more enterprise client devices 105. The AMS client devices 102, virtual assistants 103 and enterprise client devices 105 communicate over a network 104 with an answer management system (AMS) 110. As used herein, an enterprise refers to, for example, a corporation, business, group, individual, or the like. The variable M and other similar index variables herein such as X and P are assumed to be arbitrary positive integers greater than or equal to two.

As used herein, the network 104, can refer to, but is not necessarily limited to, a local area network (LAN), wide area network (WAN), cellular network, satellite network or the Internet. Network communication can be performed via one or more centralized servers or cloud data centers that receive, analyze and send data to and from one or more client or user devices, such as, for example, smart phones, tablets, desktop, laptop or other processing or computing devices, that, by way of example, are part of the network 104. The one or more client or user devices, for example, comprise the AMS client devices 102 and/or the enterprise client devices 105, which can communicate with the AMS 110 and/or the virtual assistants 103 over the network 104.

According to an embodiment, the AMS client devices 102 are used by one or more administrators that manage and/or own the virtual assistants 103. As explained in more detail herein, the administrators access the AMS 110 via the AMS client devices 102 in order to control how the virtual assistants 103 respond to customers. According to an embodiment, customers (e.g., enterprise clients) communicate with the virtual assistants 103 via the enterprise client devices 105, for example, when they need assistance.

Virtual assistants 103 (e.g., "chatbots") can help people perform a variety of tasks. For example, chatbots for banking can service users (e.g., enterprise clients via enterprise client devices 105) when interacting with their finances, such as checking an account balance, transferring money, and retrieving product information. Although financial services are used herein as an illustrative example, the embodiments are not necessarily limited thereto, and may apply to other types of services, such as, but not necessarily limited to, technical support, retail and telecommunication services.

The correspondence between responses of virtual assistants 103 and user requests is referred to herein as "cohesion" or being "cohesive." For example, when a response of a virtual assistant 103 acknowledges the rhetorical form of the user's request, the Request-Response (RR) pair is considered cohesive. The embodiments provide techniques for improving cohesion of the interactions of virtual assistants 103 with users.

In a non-limiting illustrative example, a user is interacting with a banking virtual assistant, and asks "I can't tell if I was charged for my sneakers purchase on my account ending in 0000?" A lower cohesion response by the virtual assistant may state" "I found 3 matches. I searched for <sneakers> on <account 0000>," and provide a list of the transactions. Using more cohesive language, the virtual assistant could respond: "I found 3 matches that may correspond to the charges you're searching for. I searched for <sneakers> on <account 0000>," and provide a list of the transactions. In the higher cohesion example, as can be understood from the language "I found 3 matches that may correspond to the charges you're searching for," the virtual assistant demonstrates understanding of the user's goal, which is to find a specific charge. In the lower cohesion example, the virtual assistant's language ("I found 3 matches") lacks the demonstration of an understanding of the user's goal.

Even if a virtual assistant's answer fails to respond to a user's inquiry, a more cohesive response may be more effective than a less cohesive response. For example, the more cohesive response can demonstrate a reason for the misunderstanding, while the less cohesive response does not demonstrate a reason for the misunderstanding. In keeping with the same example, a lower cohesion response that fails to respond to the user's inquiry is "I can put you in contact with one of our <BANK> representatives to dispute the transaction. <Click here for live agent>." A higher cohesion response that also fails to respond to the user's inquiry is "I understand you may have been wrongly charged for a sneaker purchase. I can put you in contact with one of our <BANK> representatives to dispute the transaction. <Click here for live agent>." In the lower cohesion example, it may be unclear what the virtual assistant understood (albeit incorrectly) about the user's interaction, whereas the reason for the misunderstanding is at least made clear in the higher cohesion example.

In order to enable virtual assistants to interact more cohesively with users, the embodiments utilize ML techniques to evaluate how many interaction modes (e.g., request types) apply to a topic of a plurality of topics. As used herein, a "topic" or "topics" refers to a label classifying the subject and/or intent of an inquiry or request. The following Table 1 comprises a non-limiting list of example requests/inquiries and corresponding topics. As explained further herein, the request-topic pairs (request-topic data 106) are used as training data to train an ML intent classifier 130 of the AWS 110.

TABLE 1

| Request/Inquiry | Topic |
| --- | --- |
| How much is an overdraft fee? | Overdraft Fees |
| What is the maturity date on my loan? | Maturity Date |
| Can you show me my maturity date for my account please? | Maturity Date |
| Did {company__name__ticker} drop? | Stock Quote |
| How is the S&P500 doing? | Stock Quote |
| Hello | Greetings |
| How long does a transfer take? | Processing Time |
| When will my transfers in my country be processed? | Processing Time |
| What are the fees for a bank statement? | Annual Fees |
| Am I charged annually to get a {@account_type investment} card? | Annual Fees |
| Can I see my account amount? | Account Balance |
| What are the fees for a bank statement? | Statements Fees |
| I want to buy a car | Affordability |
| Summarize transactions from my {@account_type cards} | Summarize Transactions |
| Show my transactions | Show Transactions |
| I did not make this charge on my card | Dispute Transactions |
| Block my debit card thank you | Card Block |
| What's the payment due date on my {@account_type loan}? | Payment Due Date |

As used herein an "interaction mode" or "request type" refers the type of interaction for an utterance. Interaction mode and request type are used interchangeably herein.

Interaction modes/request types are used to make distinctions that are related to the rhetorical form of requests to match the requests with the responses that the virtual assistants produce. Interaction modes/request types are derived from the rhetoric of the inquiry, such as, for example, whether a query asks "who," "why," "what," "when," "where," "which," "how," "Is," "Does," "Would," etc., and/or whether a query is a yes/no question, statement, directive, or one of several other categories. The following comprises a non-limiting list of example interaction modes/request types. As explained further herein, the example interaction mode/request types (interaction mode data 107) are used as training data to train an ML interaction mode classifier 120 of the AWS 110.

The interaction modes/request types are, for example: (1) Name; (2) Explanation; (3) Effect; (4) Suggestion; (5) Reason; (6) Method; (7) Permission; (8) Service; (9) Time; (10) Money; (11) Location; (12) Person; (13) Quantity; (14) Error; (15) Play; and (16) Unknown.

"Name" refers to when a user's query is expected (by virtue of how it is asked) to have a specific answer that is a name/label or list of such. Examples of queries that would be classified under the Name interaction mode/request type include, but are not necessarily limited to:
  i. What is my branch name?
  ii. What is the routing code for my company?
  iii. What category did I spend most on?
  iv. Which merchant did I spend most with?
  v. What kind of phone do I need for the app?
  vi. What currencies do you support?

"Explanation" refers to when a user is asking a general query about, for example, a definition of a term, an explanation of a service offered, or an explanation of how something works. Examples of queries that would be classified under the Explanation interaction mode/request type include, but are not necessarily limited to:
  i. What is two-factor authentication?
  ii. Tell me about goal accounts
  iii. Define bot
  iv. Explain the concept of touch ID please.
  v. Is my information safe?
  vi. Is my chat history saved?
  vii. How are my personal details safeguarded?
  viii. How does the app categorize transactions?
  ix. Can you describe the credit card?
  x. What impact does the exchange rate have?
  xi. What's Marketing Partner ID Number (MPIN) for?
  xii. I'd like to know the terms and conditions
  xiii. A bill split is what
  xiv. Do you offer a debit card on the goal account?
  xv. What rewards do you offer?
  xvi. Does my savings account accumulate money?
  xvii. What is a savings account?
  xviii. Is there any other information I need to know about the person I pay?

"Effect" refers to when a user is asking about the effects of a certain action, or what should be done if an action occurs. Examples of queries that would be classified under the Explanation interaction mode/request type include, but are not necessarily limited to:
  i. What will happen when I make a transfer?
  ii. What happens if there are no funds left in my account?
  iii. What happens when I reach a goal?
  iv. Do you send an email when someone requests a payment?
  v. What do I do if I forget my username?
  vi. What if I want to pay a friend but they don't have an account?
  vii. What occurs once my goal is met?
  viii. Will I get text messages when I'm out of the country?
  ix. What do I do if my card is damaged?
  x. What do I do to reset my personal identification number (PIN)?
  xi. What should I do if I have insufficient funds?
  xii. If I have a transaction dispute, what do I do?
  xiii. When I get a new card, will the number be the same?
  xiv. Would my new card have the same number as the previous card?

"Suggestion" refers to when a user is asking about a recommendation or suggestion about what they should do in a certain situation. Examples of queries that would be classified under the Suggestion interaction mode/request type include, but are not necessarily limited to:
  i. What health app should I use?
  ii. In order to get a response, do I have to speak in a specific way?
  iii. Tips for saving money
  iv. What offers should I look into?
  v. What is the best way to track my spending?
  vi. Do I need savings?

"Reason" refers to when a user is asking for a cause or reason for an event. According to an embodiment, the Reason interaction mode/request type does not include statements about errors, which are instead classified under the Error interaction mode/request type. Examples of queries that would be classified under the Reason interaction mode/request type include, but are not necessarily limited to:
  i. Why can't I check my account balance?
  ii. Why do I see suggested offers?
  iii. How come I see a zero balance?
  iv. If I see a zero balance, why is that happening?
  v. Can you explain why I'm seeing suggested offers?
  vi. Can you tell me more about why I am receiving a money request from someone?
  vii. Is there a reason I see a zero balance?
  viii. I don't know why I can't do it.
  ix. Why can't I give money to a person?
  x. What reasons are there to get a credit card?
  xi. Tell me why I should choose this card?

"Method" refers to when a user is asking how to do something. For example, a user may be requesting steps to execute an action. A Method interaction mode/request type may be expressed as a goal such as a user wanting or needing something. Phrases that may result in a classification under the Method interaction mode/request type include, for example, "How do I do Y," "Can you show me how to do Y," "Please help me do Y," "Where do I go to achieve Y," "Are there ways to achieve Y" and "Can I achieve Y." Examples of queries that would be classified under the Method interaction mode/request type include, but are not necessarily limited to:
  i. How do I edit my tags?
  ii. Can you show me how to edit my tags?
  iii. Tell me how to edit my tags.
  iv. How do I make a bill payment?
  v. How can I set up a standing order for local transfers?
  vi. How do I pay my credit card using the app?
  vii. How do I dispute a transaction?
  viii. What is the procedure to dispute a transaction?
  ix. Are there ways in which I can modify my category tags?
  x. What is the best way to activate a payment service?
  xi. How do I change my delivery date?

xii. Please help me change my name title.
xiii. I don't recall my password. How do I reset it?
xiv. Where do I set up my payment service?
xv. Where can I see discounts?
xvi. How do I withdraw money while out of the country?
xvii. Can I reset my pin?
xviii. Show me how to make a payment.

"Permission" refers to when a user is asking a yes/no question about whether they are permitted to do something. Phrases that may result in a classification under the Permission interaction mode/request type include, for example, "Can I do Y," "Am I able to find out Y" and "Am I eligible for Y." Examples of queries that would be classified under the Permission interaction mode/request type include, but are not necessarily limited to:
  i. Is it okay to alter a transfer that is automatic?
  ii. Can I make an international transfer using U.S. dollars?
  iii. Am I able to delete a transfer?
  iv. Am I able to remove an automatic transfer?
  v. Can an automatic deduction be modified?
  vi. Will I be able to change an automatic transfer?
  vii. Can I pay my uncle's bill using the app?
  viii. Am I able to split a bill with someone?
  ix. Can I split the bill with anyone using the app?
  x. Can I dispute a transaction?
  xi. Can my card's delivery location be changed?
  xii. Is it possible to close my account but keep one of my accounts?
  xiii. Can I make a transfer while I'm abroad?
  xiv. Do I have the option to split the bill with someone?
  xv. Am I eligible for a credit card?

"Service" refers to when a user is asking the virtual assistant to perform a service action, such as, for example, turning off an alarm, paying a bill, and showing the user information. Phrases that may result in a classification under the Service interaction mode/request type include, for example, "Can you (the virtual assistant) do Y," "Do Y for me," "Show me Y," "Let me have Y" and "I want Y." Examples of queries that would be classified under the Service interaction mode/request type include, but are not necessarily limited to:
  i. Change my password
  ii. Make a transfer
  iii. Close my account
  iv. Open an account
  v. Update profile pic
  vi. Can you turn off notifications?
  vii. Can you reset my PIN?
  viii. Can you schedule a payment for me?
  ix. Show my account balance
  x. Show my transactions from July
  xi. Show me my balance
  xii. Breakdown my balance by category
  xiii. Show my transactions for the past 6 months
  xiv. Can I see a list of my accounts?
  xv. Show me offers and discounts
  xvi. Let me view the discounts I can use
  xvii. Display the fees for a transaction
  xviii. Let me talk to a live agent
  xix. Please let me talk to an agent
  xx. I want to talk to an agent
  xxi. I want to see my discounts
  xxii. I would like to close my account but keep one of my accounts
  xxiii. I want to reset my PIN
  xxiv. I need to set up a payment service.

"Time" refers to when a user is asking about an amount of time or a specific date/time. Examples of queries that would be classified under the Time interaction mode/request type include, but are not necessarily limited to:
  i. Is there a maximum time limit to make a payment?
  ii. How long until my transfer reaches the recipient?
  iii. I submitted a help request yesterday, when will I hear a response?
  iv. How much time will it take to receive a payment?
  v. Will it take long to receive a payment?
  vi. Does it take more than 2 days to receive a payment?
  vii. How many days ahead of time can I make a request?
  viii. What is the maximum number of days in advance I can make a bill payment?
  ix. Is there a time restriction for making payments in advance?
  x. What is the delivery date?
  xi. When will I get my delivery?
  xii. When is the bank open?
  xiii. Is the bank open on Sunday?
  xiv. Will the bank be open on a holiday?
  xv. Are there dates the bank is not open?

"Money" refers to when a user is asking about an amount of money. Examples of queries that would be classified under the Money interaction mode/request type include, but are not necessarily limited to:
  i. What limit exists on the amount I can pay for a bill?
  ii. How much money did I receive since 2017?
  iii. How much do I have in my account?
  iv. What is my balance?
  v. How much can I pay on a bill at once?
  vi. How much are the ATM fees?
  vii. Are there additional fees to have a credit card?
  viii. Is there a limit on the amount I can spend?
  ix. Is there a limit on the amount I can pay for a bill?

"Location" refers to when a user is asking about a physical location (e.g., state, country, address, etc.). Examples of queries that would be classified under the Location interaction mode/request type include, but are not necessarily limited to:
  i. What countries does the app work in?
  ii. Which countries can I send money abroad?
  iii. Where is the ATM located?
  iv. Which country did I spend the most money?
  v. Are transfers available in <country>?
  vi. Do you have bank locations near me?
  vii. Which countries can I withdraw money?

"Person" refers to when a user is asking for a specific person or type of person (e.g., friends, relatives, etc.). Examples of queries that would be classified under the Person interaction mode/request type include, but are not necessarily limited to:
  i. Who is the CEO?
  ii. Who is allowed to update my information?
  iii. Who made that payment?
  iv. If I have a problem, who should I call?
  v. What salesperson have I interacted with?
  vi. Who can I send money to?
  vii. Who do I contact if I think there's been an error?
  viii. Can I talk to a live representative?
  ix. Can I talk to a manger?
  x. Is there someone I can talk to?

"Quantity" refers to when a user is asking about a finite amount other than money and time. Examples of queries that would be classified under the Quantity interaction mode/request type include, but are not necessarily limited to:
  i. How many accounts can I have open?

ii. How many transfers can I make in a day?
iii. I want to know how many kinds of discounts there are there?
iv. How many people can I pay at the same time?
v. How many statements can I get at once?
vi. How many categories do you have?
vii. How many phone numbers can I add?
viii. Is there a maximum number of accounts I can have?

"Error" refers to when a user is asking or informing about a failure, problem or lack of execution. Examples of queries that would be classified under the Error interaction mode/request type include, but are not necessarily limited to:
i. My card was just swallowed by an ATM
ii. I paid someone who doesn't have particular payment service.
iii. Wrong name on my card
iv. My card delivery failed
v. My camera is not working.
vi. I don't know why I can't do it.
vii. I've got an error message saying I don't have enough funds
viii. Please help, I've got an error message.
ix. What is causing the error I am seeing?
x. I want to know why I got this error message?
xi. I got timed out, what happened?

"Play" refers to when a user's interaction is playful and/or off topic, and may be limited to when the interaction does not fit into another interaction mode/request type. Examples of queries that would be classified under the Play interaction mode/request type include, but are not necessarily limited to:
i. I want to fly a kite
ii. I'm all alone
iii. Honey I'm home
iv. You are nice
v. Is this a joke?
vi. Jump around
vii. I need to shower
viii. I am the best
ix. Are you a person?
x. Are you a bot?

"Unknown" refers to when a user's interaction does not fit into any of the other interaction modes/request types. This includes when it is ambiguous which of multiple interaction modes/request types the interaction applies. Examples of queries that would be classified under the Unknown interaction mode/request type include, but are not necessarily limited to:
i. How can I know the exchange rate that is used? (e.g., Is this Method, Service or Explanation? Not clear.)
ii. Do I have to log off manually every time? (e.g., Is this Effect, Service or Explanation? Not clear.)
iii. Yes
iv. No
v. Thanks
vi. Ok
vii. Maybe
viii. Unsure
ix. Probably
x. ;sldkfias;ldfkj
xi. ;sdlkvcj s;xdlkfj
xii. oireuj;olskdejf As noted above, in order to enable virtual assistants to interact more cohesively with users, the embodiments utilize ML techniques to evaluate how many interaction modes (e.g., request types) apply to a topic of a plurality of topics. The following Table 2 is a modification of Table 1 above, and illustrates an interaction mode/request type corresponding to each of the example requests/inquiries and corresponding topics in the non-limiting list. As explained further herein, the requests/inquiries are partitioned based on topic and request type.

TABLE 2

| Request/Inquiry | Topic | Request Type |
| --- | --- | --- |
| How much is an overdraft fee? | Overdraft Fees | Money |
| What is the maturity date on my loan? | Maturity Date | Explanation |
| Can you show me my maturity date for my account please? | Maturity Date | Service |
| Did {company_name_ticker} drop? | Stock Quote | Explanation |
| How is the S&P500 doing? | Stock Quote | Explanation |
| Hello | Greetings | Play |
| How long does a transfer take? | Processing Time | Time |
| When will my transfers in my country be processed? | Processing Time | Time |
| What are the fees for a bank statement? | Annual Fees | Money |
| Am I charged annually to get a {@account_type investment} card? | Annual Fees | Effect |
| Can I see my account amount? | Account Balance | Permission |
| What are the fees for a bank statement? | Statements Fees | Money |
| I want to buy a car | Affordability | Unknown |
| Summarize transactions from my {@account_type cards} | Summarize Transactions | Service |
| Show my transactions | Show Transactions | Service |
| I did not make this charge on my card | Dispute Transactions | Error |
| Block my debit card thank you | Card Block | Service |
| What's the payment due date on my {@account_type loan}? | Payment Due Date | Time |

According to an embodiment, the training of the interaction mode classifier 120 comprises training baseline and enhanced neural network maximum entropy classifiers using the interaction mode data 107 to produce classifier $C_{RA}$. In accordance with one or more embodiments, $C_{RA}$ uses a normalization pipeline for English-speaking chatbots, but is not necessarily limited to English-speaking chatbots.

The AMS 110 includes the ML interaction mode classifier 120 comprising an interaction cohesion metric computation component 121 and a mode prediction component 122, and an ML intent classifier 130 comprising a topic prediction component 131 and a new topic generator 132. The AMS 110 also includes an AMS client interface and visualization engine 140 comprising a panel generation component 141, a virtual assistance interface component 142 and an AMS client feedback component 143. The AMS 110 further includes an interaction mode response generator 150 and one or more databases 160.

The databases 160 in some embodiments are implemented using one or more storage systems or devices associated with the AMS 110. The term "storage system" as used herein is therefore intended to be broadly construed, and should not be viewed as being limited to. A given storage system as the term is broadly used herein can comprise, for example, content addressable storage systems, flash-based storage systems, network attached storage (NAS), storage area networks (SANs), direct-attached storage (DAS) and distributed DAS, as well as combinations of these and other storage types, including software-defined storage.

The AMS 110 receives the request-topic data 106, the interaction mode data 107 and response data 108, which can be transmitted to the AMS 110 over network 104. The response data 108 comprises default responses that a virtual assistant(s) 103 is programmed to give to corresponding requests/inquiries from the request-topic data 106. As noted herein, the ML intent classifier 130 is trained with data labeled according to topic, and the ML interaction mode classifier 120 is trained with data labeled according to interaction mode/request type. More specifically, the request-topic data 106 described in connection with Table 1 is used to train the ML intent classier 130, and the interaction mode data 107 described above is used to train the ML interaction mode classifier 120. The data 106, 107 and 108 received by the AMS 110 is stored in one or more databases 160.

The ML interaction mode classifier 120 includes the interaction cohesion metric computation component 121, which executes an evaluation metric to compute a cohesion score for the requests/inquiries and the default responses for each of a plurality of topics from the request-topic data 106. The cohesion score measures a degree of correspondence between given requests and given responses for a given topic.

According to an embodiment, in connection with computing the cohesion score, a topic represents a request goal including a label, slots, training data, response templates, and a topic flow reasoner. If a is a topic, then $T_\alpha$ represents its training data and $R_\alpha$ represents the set of responses for the topic. A dialogue management system manages the rules about which response to give after a topic has been triggered, and whether to continue the topic, interrupt, exit, or reopen. $\{0, 1\} \rightarrow$ ISFINISHED($\alpha$) returns true if a chatbot should provide a final response. In an embodiment, the topics are already delineated by their slots and therefore each topic maps to a single final response s.t. $|R\alpha|=1$.

The training data in each topic (e.g., data 106) is used to train a chatbot-specific topic classifier, $C_\alpha$, distinct from $C_{RA}$. A slot classifier is also trained on terms in topic training data (e.g., data 106) to produce a set of classifiers $C_S=\{C_0, \ldots, C_n\}$, one of each topic with non-empty slots.

The evaluation metric can be used to measure request-response (RR) cohesion (and changes thereto) over time. The measurement is based on how distributed the training data of a topic is across interaction modes, as assigned according to the classifier $C_{RA}$. Given a topic, its cohesion score (REQCOH($\alpha$)) is set forth in equation (1) as follows:

$$REQCOH(\alpha) = \sqrt{\sum_{ra \in RA} \left( \frac{|\{q : q \in T_a, ra = C_{RA}(q)\}|}{|T_a|} \right)^2} \quad (1)$$

REQCOH is high when training data is homogeneous with respect to interaction mode, and low when training data is distributed. If interaction mode frequency in training data of a topic predicts the interaction mode of utterances that are tagged to that topic, then REQCOH may be a predictor for RR cohesion. A variety of interaction modes in the data means that some requests are matched with a rhetorical complement, and others are not.

The ML interaction mode classifier 120 includes the mode prediction component 122, which partitions a plurality of requests from the request-topic data 106 into a plurality of partitions corresponding to a plurality of request types (e.g., interaction modes). The mode prediction component 122 is configured to identify different request types in the request-topic data using ML classifiers trained with the interaction mode data 107.

Figure 2:
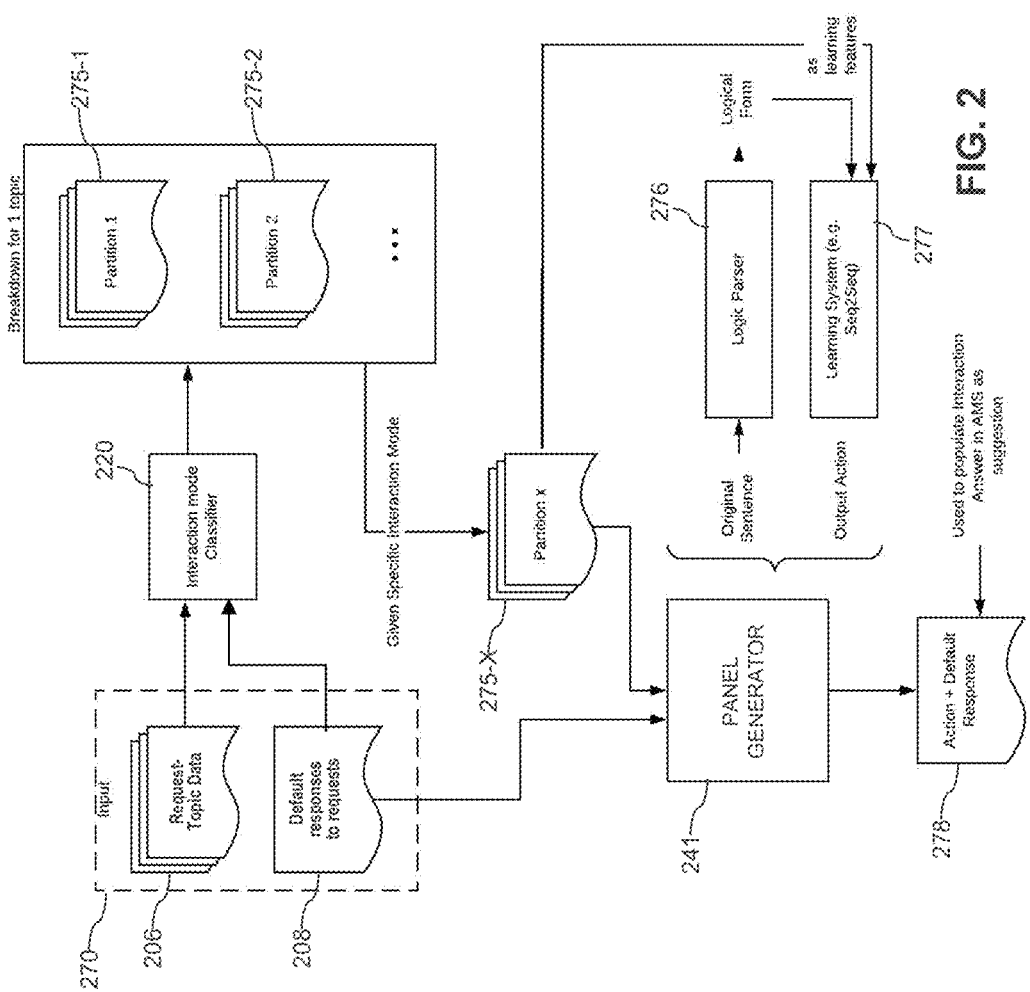
FIG. 2 is an operational flow diagram for interactive display generation in an AMS in an illustrative embodiment.

Referring to FIG. 2, the input 270 to an interaction mode classifier 220 comprises request-topic data 206 and default response data 208. The request-topic data 206 and the default response data 208 is used by the interaction mode classier 220 in connection with computing cohesion scores for requests/inquiries and their default responses for each of a plurality of topics. Similar to FIG. 2, FIG. 3 illustrates input 370 comprising request-topic and response data to an AMS 310 comprising an interaction mode classifier 320.

Figure 3:
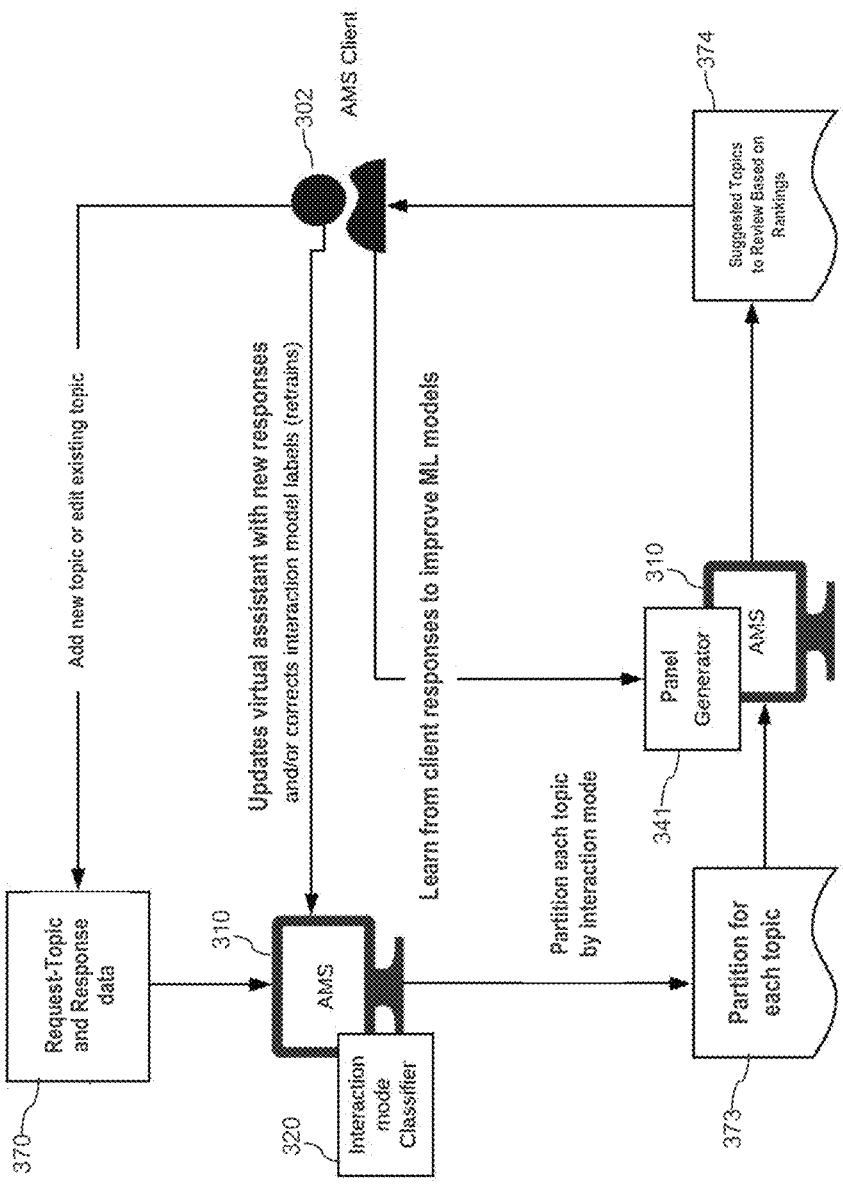
FIG. 3 is an operational flow diagram for a machine learning cycle for an AMS in an illustrative embodiment.

Referring to FIGS. 1, 2 and 3, the interaction mode classifier 120/220/320 identifies which of the plurality of request types (e.g., interaction modes) correspond to each topic of a plurality of topics. In other words, the interaction mode classifier 120/220/320 determines how many request types are applicable to each topic. For example, the topic of "processing time" described herein above may include, for example, reason, time, method and error interaction modes/request types. In order to determine which interaction modes/request types apply to a topic, the interaction mode classifier 120/220/320 and, more specifically, the mode prediction component 122, evaluates the request-topic data and splits the data into groups corresponding to the most common interaction modes for a topic's data.

As the number of interaction modes increases for each topic, the management of the virtual assistant's responses becomes increasingly more difficult. The AMS 110 includes an AMS client interface and visualization engine 140 for creating a user interface for an administrator or other user to visualize the interaction modes that are discovered in the request-topic data, and to review and edit the responses the virtual assistant(s) 103 would give for each interaction mode. The administrator or other user access the created user interface via, for example, one of the AMS client devices 102.

The panel generation component 141 of the AMS client interface and visualization engine 140 generates the interface for the user. As explained further in connection with FIGS. 6-8 and 9B, the interface displays a subset of requests corresponding to a partition of a plurality of partitions and displays a default response corresponding to the subset of requests. Each partition corresponds to an interaction mode of a particular topic. For example, in connection with the "processing time" topic example, the partitions respectively correspond to the reason, time, method and error interaction modes/request types. For each of those partitions, the interface displays a number of requests/inquiries pertaining to the interaction mode/request type of that partition which may be presented by a user to a virtual assistant. For each of the partitions, the interface also displays a default answer of the virtual assistant to the number of requests/inquiries, which can be edited by a user in an editable field of the interface. Each of the partitions is displayed in what is referred to herein as a "panel" generated by the panel generation component 141. Similarly, FIGS. 2 and 3 include panel generators 241 and 341, respectively. Referring to FIG. 2, the partitions 1, 2 and X (275-1, 275-2, . . . , 275-X) (collectively, "partitions 275") for a given topic are shown. The partitions 275 each correspond to an interaction mode. As shown, partition 275-X corresponds to a given interaction mode.

The responses the virtual assistant(s) provide in each interaction mode are derived from the response data 108. According to an embodiment, in order to populate the responses for each interaction mode of each respective partition, an interaction mode response generator 150 uses one or more ML techniques to automatically generate variations of the default responses of the virtual assistant(s) 103 for each interaction mode. The default responses (i.e., responses 108) comprise programmed responses that the virtual assistant(s) give in response to user requests appearing, for example, in the request-topic data 106. The automated generation of interaction mode responses for each partition can be learned from, for example, human agent chat logs and/or from rules that are programmed for each interaction mode.

According to an embodiment, the interaction mode response generator 150 utilizes a customized parser (element 276 in FIG. 2) to construct a logical proposition for each topic, or such a logical proposition is manually input for each topic. The proposition ("Logical Form" in FIG. 2) is run through an ML algorithm (element 277 in FIG. 2 using, e.g., Sequence-to-sequence (Seq2Seq) learning) for constructing an action ("Output Action" in FIG. 2) that can be appended to the beginning of the default responses. In operation, by appending a short action to the beginning of a default response ("Original Sentence" in FIG. 2) to address the interaction mode of the user, a virtual assistant 103 appears to better understand a user's original question when compared to the default response on its own. For example, referring to the cohesion example discussed above, the higher cohesion example includes the language "I found 3 matches that may correspond to the charges you're searching for," which demonstrates understanding of the user's goal to find a specific charge. Whereas, the lower cohesion example ("I found 3 matches") lacks the demonstration of an understanding of the user's goal. As can be seen in FIG. 2, ML algorithm uses an identification of the interaction mode based on the relevant partition (Partition X 275-X).

Figure 9A:
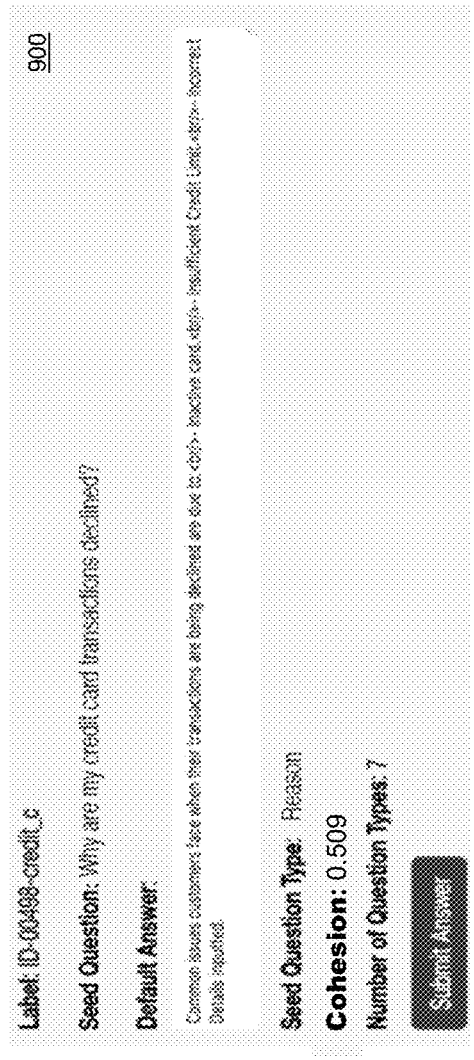
FIG. 9A is an image of a screenshot of a user interface showing a reason seed question type and for inputting a response to the reason seed question type in an illustrative embodiment.

Referring to the screenshot images 500 and 900 in FIGS. 5 and 9A, a seed question and default response (labeled "Default Answer") are analyzed by the ML interaction mode classifier 120/220/320 to determine the seed question request type/interaction mode (labeled "Seed Question Type"). The screenshots 500 and 900 also display the number of request type/interaction modes (labeled "Number of Question Types") determined by the ML interaction mode classifier 120/220/320 for the seed question. In the screenshot 500, the seed question request type/interaction mode is "Description," and the number of request type/interaction modes is 9. In the screenshot 900, the seed question request type/interaction mode is "Reason," and the number of request type/interaction modes is 7. The seed questions and default responses are taken from the request-topic and response data 106, 108.

Figure 9B:
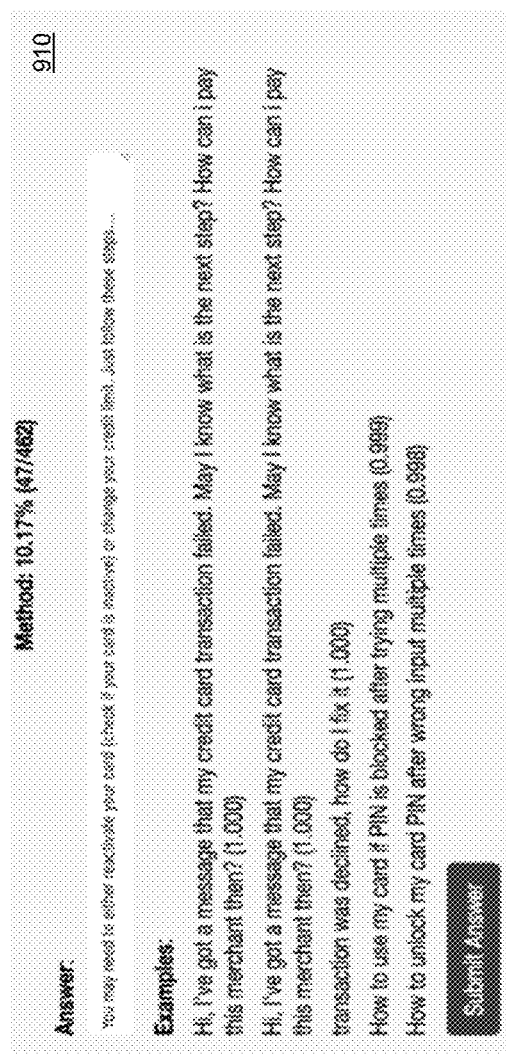
FIG. 9B is an image of a screenshot of a user interface for inputting a response for a method question type in an illustrative embodiment.

The images of the screenshots 600, 700 and 800 in FIGS. 6-8 display user interfaces comprising partitions for three of the request type/interaction modes (method, reason and error) for the seed question in screenshot 500, and the image of the screenshot 910 in FIG. 9B displays a user interface comprising a partition for one of the request type/interaction modes (method) for the seed question in screenshot 900. Referring to FIGS. 6, 7 and 8, automatically generated variations of the default response in FIG. 5 appear under the "Answer" label for the method, reason and error interaction modes, respectively. Referring to FIG. 9B, the automatically generated variation of the default response in FIG. 9A appears under the "Answer" label for the method interaction mode. In addition, each of the screenshots 600, 700, 800 and 910 include one or more example requests (under the "Examples") label for each of their corresponding interaction modes. The requests are in a form to correspond to the interaction mode of the screenshot, and may be answered by the answer of the screenshot. As noted herein, the answer for each screenshot 600, 700, 800 and 910, as well as the default answer in the screenshots 500 and 900 can be edited by a user, such as a virtual assistant administrator or manager, via the user interface. After the responses are edited, the user can actuate the "Submit Answer" icon so that the AMS client feedback component 143 can process the responses edited by the user. Using a virtual assistant application programming interface (API), the edited responses can be transmitted to the virtual assistant(s) to be used in connection with responding to actual queries provided by users via enterprise client devices 105. As used herein, "application programming interface (API)" refers to a set of subroutine definitions, protocols, and/or tools for building software. Generally, an API defines communication between software components. APIs permit programmers to write software applications consistent with an operating environment or website.

According to an embodiment, the topic prediction component 131 of the ML intent classifier 130 classifies each of the requests in the request-topic data 106 under respective topics of the plurality of topics. The topic prediction component 131 also computes a frequency of usage of the plurality of requests by the users (e.g., enterprise clients via enterprise client devices 105) of the virtual assistant(s) 103. Details and statistics on the frequency of usage of the plurality of requests are provided to the AMS 110 as part of the request-topic data 106 and/or in other forms from the virtual assistants 103, which may include applications or other software to monitor such use. The topic prediction component 131 ranks the plurality of topics from the request-topic data 106 based on the computed cohesion scores and the computed frequencies of usage. Topics with a relatively low cohesion score and a relatively high frequency of usage are ranked higher than topics with a relatively high cohesion score and a relatively low frequency of usage. Once partitioned, the higher ranked topics are presented to users via the user interface before the lower ranked topics so that users are presented with the problematic topics (i.e., those having lower cohesion scores) that are encountered most often (higher frequency of usage). Alternatively, users can search for a particular topic by name in a search field in the user interface.

Referring to FIG. 3, each topic is partitioned according to interaction mode 373. According to an embodiment, the panel generator 341 generates a media page for each topic, ranking each topic by cohesion score and/or usage frequency. The suggested topics to review based on the rankings 374 are provided to an AMS client 302 in the form of the partitions including the automatically generated responses. The client 302 reviews the proposed responses for given interaction modes, and can approve the responses, correct labels (e.g., incorrect interaction modes) and/or provide new/modified responses. As shown by the arrows from the AMS client 302 to the panel generator 341, interaction mode classifier 320, and AMS 310, the AMS client feedback component (143 in FIG. 1) processes the responses/modifications of the AMS client 302 to improve the ML models used by the classifiers 120 and/or 130 and/or the panel generation component 141 when determining interaction modes, topics and generating responses.

In addition, the edited responses are provided to the virtual assistants 103 via the AMS 110 so that the virtual assistants 103 can respond to users with the updated responses. According to an embodiment, each of the panels has a text editing box/field loaded with a response provided by the virtual assistant for a given request or plurality of requests. When the AMS client 302 edits the response for an interaction mode, and submits it, the virtual assistant 103 updates its response to the new/edited answer for the condition where the virtual assistant is responding to a given topic and interaction mode. On subsequent usage of the virtual assistant, the new responses are used during an interaction with a user.

Updates to a virtual assistant's responses following editing by an AMS client can be performed in real-time responsive to the editing. As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which the embodiments are implemented, other appropriate timescales that provide at least contemporaneous performance and output can be achieved.

According to an embodiment, a user can set a minimum confidence threshold on each panel corresponding to a minimum confidence of an interaction mode classification such that the virtual agent uses a specific interaction-mode based response only when the confidence is exceeded.

As depicted further in FIG. 3 by the arrow from the AMS client 302 back to the request-topic and response data 370, a new topic in addition to the plurality of topics may be generated or an existing topic may be edited by clustering a plurality of edited responses. The new or edited topic may be necessary to conform with changes made by the AMS client 302. According to an embodiment, displays are created for new candidate topics that are automatically discovered by clustering annotated responses.

Referring to the screenshots 500 and 900 in FIGS. 5 and 9A, an RR cohesion score for the seed question with respect to the default response is displayed in the interface in the "Cohesion" fields. Referring to the screenshots 600, 700, 800 and 910 in FIGS. 6, 7, 8 and 9B, each of the interaction mode labels (e.g., method, reason and error) includes a percentage value and a fraction from which the percentage value is obtained. Each of these percentage values represents the amount of training data classified under a particular interaction mode for a topic. For example, in connection with the topic for FIGS. 6, 7 and 8, the training data is classified under the method interaction mode for 18.81% of the data, the reason interaction mode for 16.81% of the data, and the error interaction mode for 15.36% of the data. In connection with the topic for FIG. 9B, the training data is classified under the method interaction mode for 10.17% of the data. This percentage information provides a user with details regarding how the interaction mode classifier 120/220/320 classifies requests for a given topic, and which interaction modes appear most frequently for the given topic.

According to an embodiment, each panel on an interactive display is created for each partition with a minimum threshold number of training examples, and the top n example requests that best fit the interaction mode are displayed in the panel. For example, in FIG. 6, the top 5 example requests that best fit the method interaction mode are displayed. As shown, the examples each have a score of 1.000 indicating the best fit to interaction mode on a scale from 0 to 1. Similarly, in FIG. 7, the top 5 example requests that best fit the reason interaction mode are displayed with scores of 1.000. In FIG. 8, one example request with a score of 1 is displayed for the error interaction mode, and in FIG. 9B, the top 5 example requests that best fit the method interaction mode are displayed with their scores of 1.000, 0.999 or 0.998. The threshold number of example requests can be pre-programmed or automatically determined, and displayed on the interface.

Figure 4:
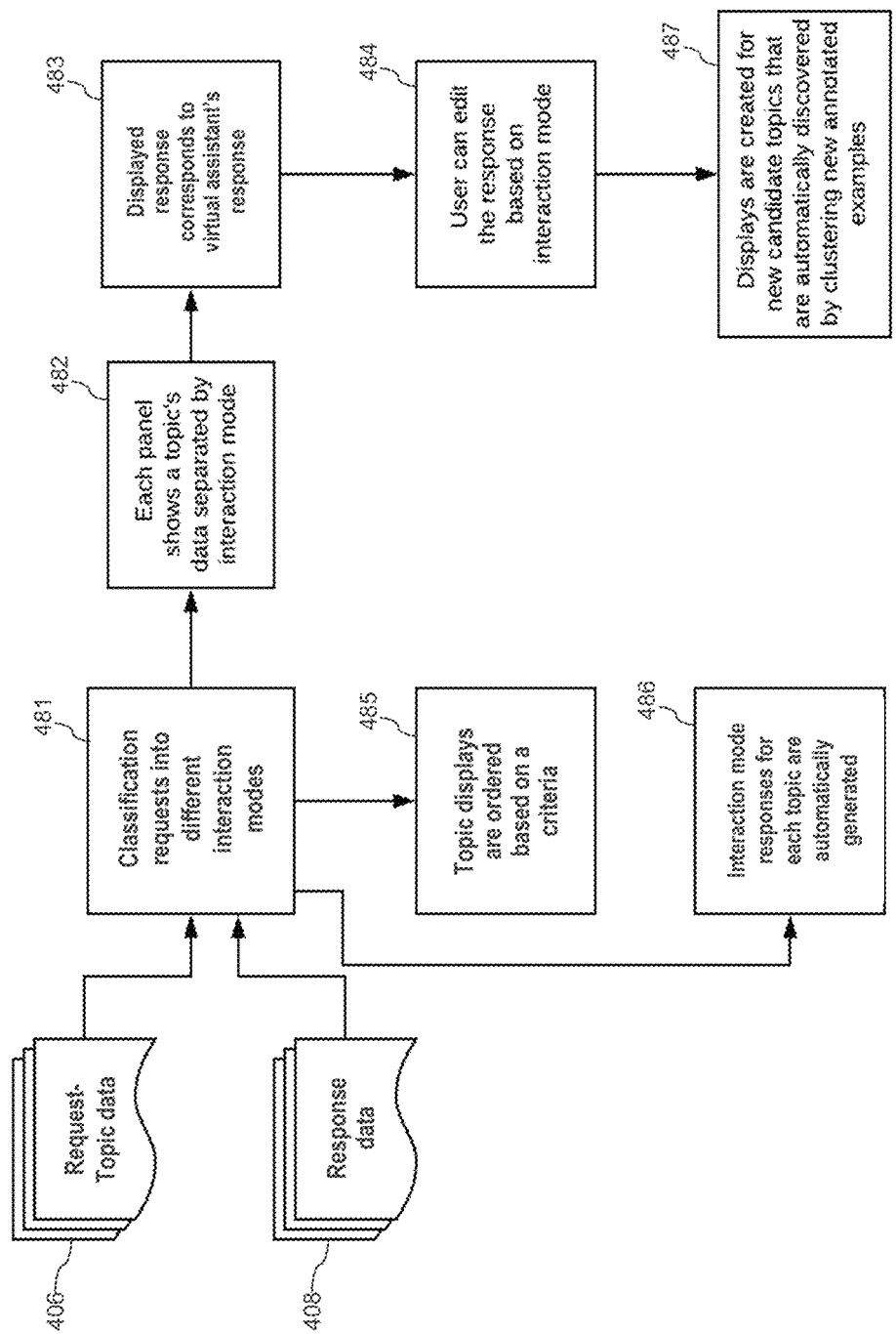
FIG. 4 is an operational flow diagram for automated cohesive response generation in an illustrative embodiment.

FIG. 4 is an operational flow diagram for automated cohesive response generation in an illustrative embodiment. Referring to FIG. 4, the input data comprises request-topic data 406 and response data 408. At block 481, requests are automatically classified into different interaction modes/request types to enable more cohesive interactions. At block 482, each panel on a user interface displays data of a topic separated by interaction mode, and at block 483, a displayed response in a panel corresponds to a virtual assistant's response in connection with a particular topic and interaction mode. At block 484, a user can edit a response via the user interface based on interaction mode, and at block 487, displays are created for new candidate topics that are automatically discovered by clustering annotated responses. At block 485, topic displays presented to a user are ordered (e.g., ranked) based on a given criteria, such as, for example, the combination of cohesion score and frequency of usage as described herein. At block 486, the responses for each interaction mode in a partition are automatically generated based on the default response of a virtual assistant.

Figure 10:
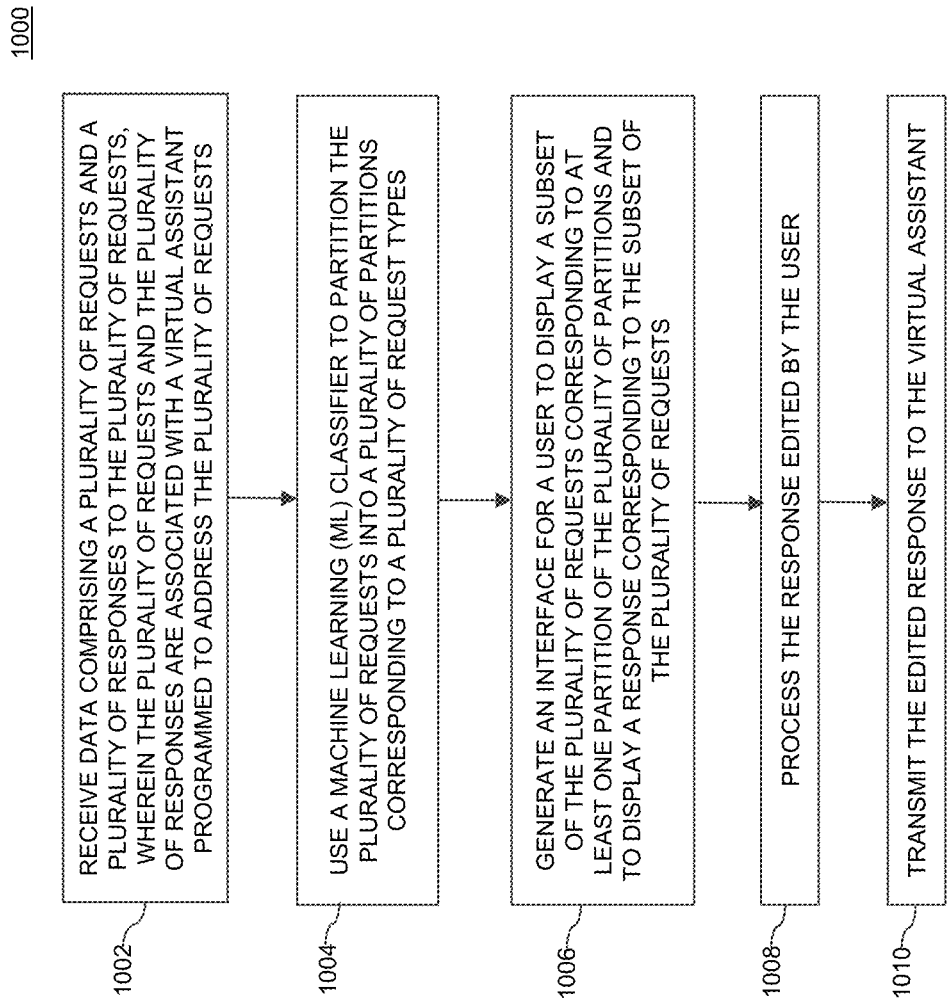
FIG. 10 is a flow diagram of a method for managing and editing interaction modes for a virtual assistant in an illustrative embodiment.

The operation of the processing system 100 will now be described in further detail with reference to the flow diagram of FIG. 10. With reference to FIG. 10, a process 1000 for managing and editing interaction modes for a virtual assistant as shown includes steps 1002 through 1010, and is suitable for use in the system 100 but is more generally applicable to other types of processing systems comprising an AMS configured for managing and editing interaction modes for a virtual assistant.

In step 1002, data comprising a plurality of requests and a plurality of responses to the plurality of requests are received by, for example, the AMS 110. The plurality of requests and the plurality of responses are associated with at least one virtual assistant 103 programmed to address the plurality of requests.

Referring to step 1004, an ML classifier (e.g., interaction mode classifier 120) is used to partition the plurality of requests into a plurality of partitions corresponding to a plurality of request types (e.g., interaction modes). In step 1006, an interface for a user to display a subset of the plurality of requests corresponding to at least one partition of the plurality of partitions and to display a response corresponding to the subset of the plurality of requests is generated. The response is based on one or more of the plurality of responses. For example, the interaction mode response generator 150 automatically generates the response derived from at least one of the default responses. As described herein, the interface is configured to permit editing of the response by the user. In steps 1008 and 1010, the user edited response is processed by the AMS 110 and transmitted to the virtual assistant.

It is to be appreciated that the FIG. 10 process and other features and functionality described above can be adapted for use with other types of processing systems configured to execute management of a virtual assistant using an AMS or other type of processing platform.

The particular processing operations and other system functionality described in conjunction with the flow diagram of FIG. 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The term "client," "customer," "administrator" or "user" herein is intended to be broadly construed so as to encompass numerous arrangements of human, hardware, software or firmware entities, as well as combinations of such entities. In some embodiments, the AMS client devices 102 are assumed to be associated with system administrators, information technology (IT) managers, software developers or other authorized personnel configured to access and utilize the AMS 110.

Although shown as elements of the AMS 110, the ML interaction mode classifier 120, ML intent classifier 130, AMS client interface and visualization engine 140, interaction mode response generator 150 and/or database(s) 160 in other embodiments can be implemented at least in part externally to the AMS 110, for example, as stand-alone servers, sets of servers or other types of systems coupled to the network 104.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 11:
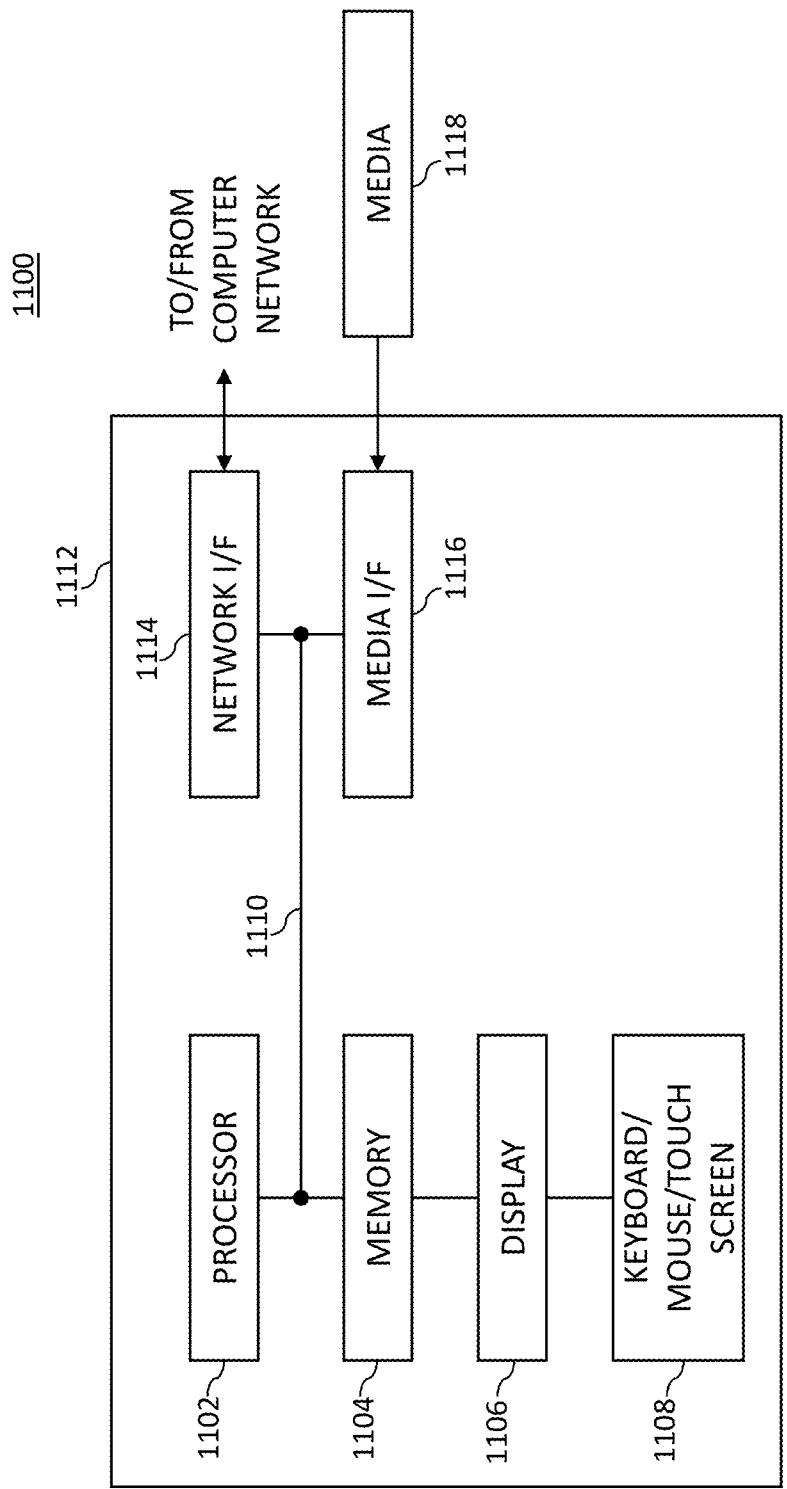
FIGS. 11 and 12 show examples of processing platforms that may be utilized to implement at least a portion of an information processing system in illustrative embodiments.

FIG. 11 illustrates a computer system 1100 in accordance with which one or more embodiments of a transaction analysis system can be implemented. That is, one, more than one, or all of the components and/or functionalities shown and described in the context of FIGS. 1-10 can be implemented via the computer system depicted in FIG. 11.

By way of illustration, FIG. 11 depicts a processor 1102, a memory 1104, and an input/output (I/O) interface formed by a display 1106 and a keyboard/mouse/touchscreen 1108. More or less devices may be part of the I/O interface. The processor 1102, memory 1104 and I/O interface are interconnected via computer bus 1110 as part of a processing unit or system 1112 (such as a computer, workstation, server, client device, etc.). Interconnections via computer bus 1110 are also provided to a network interface 1114 and a media interface 1116. Network interface 1114 (which can include, for example, transceivers, modems, routers and Ethernet cards) enables the system to couple to other processing systems or devices (such as remote displays or other computing and storage devices) through intervening private or public computer networks (wired and/or wireless). Media interface 1116 (which can include, for example, a removable disk drive) interfaces with media 1118.

The processor 1102 can include, for example, a central processing unit (CPU), a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1102. Memory 1104 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1104 may comprise electronic memory such as random-access memory (RAM), read-only memory (ROM) or other types of memory, in any combination. The one or more software programs when executed by a processing device such as the processing unit or system 1112 causes the device to perform functions associated with one or more of the components/steps of system/methodologies in FIGS. 1-10. One skilled in the art would be readily able to implement such software given the teachings provided herein. Other examples of processor-readable storage media embodying the embodiments may include, for example, optical or magnetic disks.

Still further, the I/O interface formed by devices 1106 and 1108 is used for inputting data to the processor 1102 and for providing initial, intermediate and/or final results associated with the processor 1102.

Figure 12:
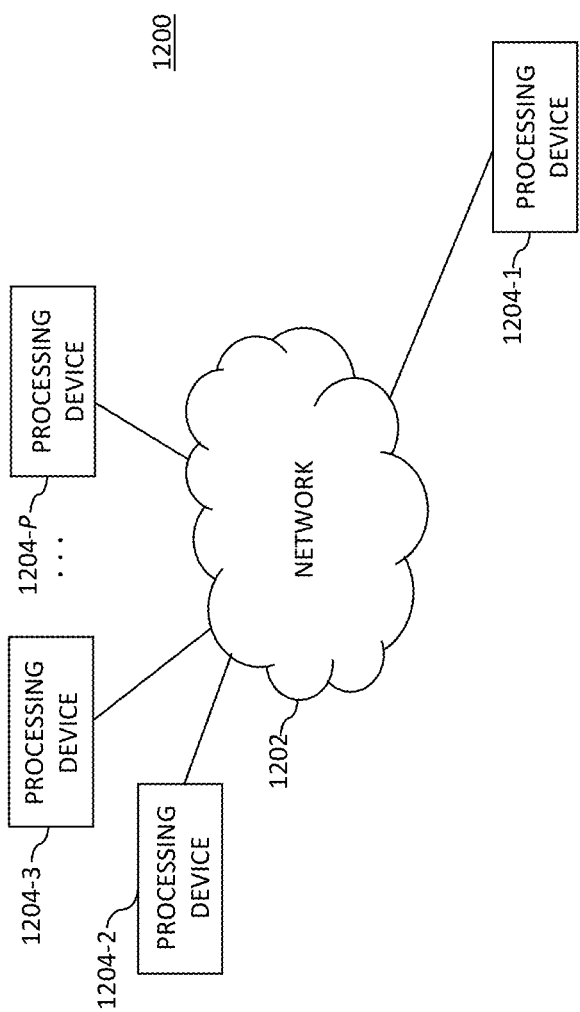

FIG. 12 illustrates a distributed communications/computing network (processing platform) in accordance with which one or more embodiments can be implemented. By way of illustration, FIG. 12 depicts a distributed communications/computing network (processing platform) 1200 that includes a plurality of processing devices 1204-1 through 1204-P (herein collectively referred to as processing devices 1204) configured to communicate with one another over a network 1202.

The term "processing platform" as used herein is intended to be broadly construed so as to encompass, by way of illustration and without limitation, multiple sets of processing devices and one or more associated storage systems that are configured to communicate over one or more networks.

It is to be appreciated that one, more than one, or all of the processing devices 1204 in FIG. 12 may be configured as shown in FIG. 11. It is to be appreciated that the methodologies described herein may be executed in one such processing device 1204, or executed in a distributed manner across two or more such processing devices 1204. It is to be further appreciated that a server, a client device, a computing device or any other processing platform element may be viewed as an example of what is more generally referred to herein as a "processing device." The network 1202 may include, for example, a global computer network such as the Internet, a wide area network (WAN), a local area network (LAN), a satellite network, a telephone or cable network, or various portions or combinations of these and other types of networks (including wired and/or wireless networks).

As described herein, the processing devices 1204 may represent a large variety of devices. For example, the processing devices 1204 can include a portable device such as a mobile telephone, a smart phone, personal digital assistant (PDA), tablet, computer, a client device, etc. The processing devices 1204 may alternatively include a desktop or laptop personal computer (PC), a server, a microcomputer, a workstation, a kiosk, a mainframe computer, or any other information processing device which can implement any or all of the techniques detailed in accordance with one or more embodiments.

One or more of the processing devices 1204 may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

Additionally, as noted herein, one or more modules, elements or components described in connection with the embodiments can be located geographically-remote from one or more other modules, elements or components. That is, for example, the modules, elements or components shown and described in the context of FIGS. 1-4 can be distributed in an Internet-based environment, a mobile telephony-based environment, a kiosk-based environment and/or a local area network environment. The AMS, as described herein, is not limited to any particular one of these implementation environments. However, depending on the operations being performed by the system, one implementation environment may have some functional and/or physical benefits over another implementation environment.

The processing platform 1200 shown in FIG. 12 may comprise additional known components such as batch processing systems, parallel processing systems, physical machines, virtual machines, virtual switches, storage volumes, etc. Again, the particular processing platform shown in this figure is presented by way of example only, and may include additional or alternative processing platforms, as well as numerous distinct processing platforms in any combination. Also, numerous other arrangements of servers, clients, computers, storage devices or other components are possible in processing platform 1200.

Furthermore, it is to be appreciated that the processing platform 1200 of FIG. 12 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be appreciated that combinations of the different implementation environments are contemplated as being within the scope of the embodiments. One of ordinary skill in the art will realize alternative implementations given the illustrative teachings provided herein.

The terminology used herein is for the purpose of describing particular embodiments only and is not intended to be limiting. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

Advantageously, the embodiments use ML techniques to classify topics and determine interaction modes of queries proffered to a virtual assistant. The embodiments also partition the queries based on the determined interaction modes, and generate a user interface to permit users to edit the virtual assistant's responses based on interaction mode. Conventional techniques fail to provide users with fine-grained control over responses, and fail to match responses of a virtual assistant with the way a user is interacting. Unlike conventional techniques, which require users to manually select which questions represent different answers, the embodiments of this disclosure provide techniques for evaluating cohesion between requests and responses. Moreover, the interaction mode classifier of the embodiments advantageously is trained with its own data labeled according to interaction mode. The embodiments also propose a statistical approach via the interaction mode classifier to select an answer to a question based on cohesion, or rhetorical fit.

Conventional approaches focus on information retrieval (IR) for factoid-based questions about unstructured text. Unlike conventional approaches, the embodiments utilize an intent and slots architecture for fulfilling non-IR task-based requests, such as, for example, retrieving account information, showing transactions, and showing prices and fees for new cards, etc., where the information does not need to be extracted from a passage of text, but instead is already stored in the form of a client-reviewed system response. As a result, the embodiments alleviate the effort needed for clients to configure and review system responses based on the way the user interacts with the system, so that the responses can better demonstrate that the user's input is understood by the interactive system.

Although illustrative embodiments have been described herein with reference to the accompanying drawings, it is to be understood that the embodiments are not limited to those precise descriptions, and that various other changes and modifications may be made by one skilled in the art without departing from the scope or spirit of the disclosure. Numerous other alternative embodiments within the scope of the appended claims will be readily apparent to those skilled in the art.

What is claimed is:
1. An apparatus comprising:
at least one processing platform comprising a plurality of processing devices;
said at least one processing platform being configured:
to receive data comprising a plurality of requests and a plurality of responses to the plurality of requests, wherein the plurality of requests and the plurality of responses are associated with a virtual assistant programmed to address the plurality of requests;

to use a machine learning (ML) classifier to partition the plurality of requests into a plurality of partitions corresponding to a plurality of request types;

to generate an interface for a user to display a subset of the plurality of requests corresponding to at least one partition of the plurality of partitions and to display a response corresponding to the subset of the plurality of requests;

wherein the response is based on one or more of the plurality of responses;

wherein the interface is configured to permit editing of the response by the user;

to process the response edited by the user;

to transmit the edited response to the virtual assistant and to use the ML classifier to execute an evaluation metric to compute a cohesion score for the plurality of requests and for the plurality of responses for each of a plurality of topics;

wherein the cohesion score measures a degree of correspondence between given requests of the plurality of requests and given responses of the plurality of responses for a given topic.

2. The apparatus of claim 1 wherein said at least one processing platform is further configured to compute a frequency of usage of the plurality of requests.

3. The apparatus of claim 2 wherein said at least one processing platform is further configured to rank the plurality of topics based on the cohesion score and the frequency of usage.

4. The apparatus of claim 3 wherein in ranking the plurality of topics, said at least one processing platform is configured to rank topics with a first cohesion score and a first frequency of usage higher than topics with a second cohesion score and a second frequency of usage, wherein the first cohesion score is lower than the second cohesion score, and the first frequency of usage is higher than the second frequency of usage.

5. The apparatus of claim 1 wherein the at least one partition further corresponds to a topic of the plurality of topics.

6. The apparatus of claim 5 wherein said at least one processing platform is further configured to generate a new topic in addition to the plurality of topics by clustering a plurality of edited responses.

7. The apparatus of claim 1 wherein, in partitioning the plurality of requests into the plurality of partitions, said at least one processing platform is configured to use the ML classifier to identify which of the plurality of request types correspond to a topic of the plurality of topics.

8. The apparatus of claim 7 wherein said at least one processing platform is further configured to use an additional ML classifier to assign each of the plurality of requests to respective topics of the plurality of topics.

9. The apparatus of claim 8 wherein said at least one processing platform is further configured to train the additional ML classifier with training data labeled by the respective topics of the plurality of topics.

10. The apparatus of claim 1 wherein said at least one processing platform is further configured to train the ML classifier with training data labeled by respective ones of a plurality of request types.

11. The apparatus of claim 1 wherein the virtual assistant comprises a chatbot.

12. An apparatus comprising:
at least one processing platform comprising a plurality of processing devices;
said at least one processing platform being configured:
to receive data comprising a plurality of requests and a plurality of responses to the plurality of requests, wherein the plurality of requests and the plurality of responses are associated with a virtual assistant programmed to address the plurality of requests;
to use a machine learning (ML) classifier to partition the plurality of requests into a plurality of partitions corresponding to a plurality of request types;
to generate an interface for a user to display a subset of the plurality of requests corresponding to at least one partition of the plurality of partitions and to display a response corresponding to the subset of the plurality of requests;
wherein the response is based on one or more of the plurality of responses;
wherein the interface is configured to permit editing of the response by the user;
to process the response edited by the user;
to transmit the edited response to the virtual assistant
to determine a threshold number of the plurality of requests having a best fit to a request type of the at least one partition; and
to assign the threshold number of the plurality of requests to the subset.

13. The apparatus of claim 1 wherein said at least one processing platform is further configured to automatically modify one or more of the plurality of responses based on a given one of the plurality of request types.

14. A method comprising:
receiving data comprising a plurality of requests and a plurality of responses to the plurality of requests, wherein the plurality of requests and the plurality of responses are associated with a virtual assistant programmed to address the plurality of requests;
using a machine learning (ML) classifier to partition the plurality of requests into a plurality of partitions corresponding to a plurality of request types;
generating an interface for a user to display a subset of the plurality of requests corresponding to at least one partition of the plurality of partitions and to display a response corresponding to the subset of the plurality of requests;
wherein the response is based on one or more of the plurality of responses;
wherein the interface is configured to permit editing of the response by the user;
processing the response edited by the user;
transmitting the edited response to the virtual assistant; and
using the ML classifier to execute an evaluation metric to compute a cohesion score for the plurality of requests and for the plurality of responses for each of a plurality of topics;
wherein the cohesion score measures a degree of correspondence between given requests of the plurality of requests and given responses of the plurality of responses for a given topic; and
wherein the method is performed by at least one processing platform comprising at least one processing device comprising a processor coupled to a memory.

15. The method of claim 14 further comprising computing a frequency of usage of the plurality of requests.

16. The method of claim 15 further comprising ranking the plurality of topics based on the cohesion score and the frequency of usage.

17. The method of claim 14 wherein partitioning the plurality of requests into the plurality of partitions comprises using the ML classifier to identify which of the plurality of request types correspond to a topic of the plurality of topics.

18. The method of claim 17 further comprising using an additional ML classifier to assign each of the plurality of requests to respective topics of the plurality of topics.

19. The method of claim 18 further comprising training the additional ML classifier with training data labeled by the respective topics of the plurality of topics.

20. The method of claim 14 further comprising training the ML classifier with training data labeled by respective ones of a plurality of request types.

21. The method of claim 14 further comprising automatically modifying one or more of the plurality of responses based on a given one of the plurality of request types.

22. A computer program product comprising a non-transitory processor-readable storage medium having stored therein program code of one or more software programs, wherein the program code when executed by at least one processing platform causes said at least one processing platform:
- to receive data comprising a plurality of requests and a plurality of responses to the plurality of requests, wherein the plurality of requests and the plurality of responses are associated with a virtual assistant programmed to address the plurality of requests;
- to use a machine learning (ML) classifier to partition the plurality of requests into a plurality of partitions corresponding to a plurality of request types;
- to generate an interface for a user to display a subset of the plurality of requests corresponding to at least one partition of the plurality of partitions and to display a response corresponding to the subset of the plurality of requests;
- wherein the response is based on one or more of the plurality of responses;
- wherein the interface is configured to permit editing of the response by the user;
- to process the response edited by the user;
- to transmit the edited response to the virtual assistant; and
- to use the ML classifier to execute an evaluation metric to compute a cohesion score for the plurality of requests and for the plurality of responses for each of a plurality of topics;
- wherein the cohesion score measures a degree of correspondence between given requests of the plurality of requests and given responses of the plurality of responses for a given topic.

23. The computer program product of claim 22 wherein the program code further causes said at least one processing platform to compute a frequency of usage of the plurality of requests.

24. The computer program product of claim 23 wherein the program code further causes said at least one processing platform to rank the plurality of topics based on the cohesion score and the frequency of usage.

25. The computer program product of claim 22 wherein, in partitioning the plurality of requests into the plurality of partitions, the program code further causes said at least one processing platform to use the ML classifier to identify which of the plurality of request types correspond to a topic of the plurality of topics.

26. The computer program product of claim 25 wherein the program code further causes said at least one processing platform to use an additional ML classifier to assign each of the plurality of requests to respective topics of the plurality of topics.

27. The computer program product of claim 26 wherein the program code further causes said at least one processing platform to train the additional ML classifier with training data labeled by the respective topics of the plurality of topics.

28. The computer program product of claim 22 wherein the program code further causes said at least one processing platform to train the ML classifier with training data labeled by respective ones of a plurality of request types.

29. The computer program product of claim 22 wherein the program code further causes said at least one processing platform to automatically modify one or more of the plurality of responses based on a given one of the plurality of request types.

* * * * *